United States Patent
Yang et al.

(10) Patent No.: US 9,323,737 B2
(45) Date of Patent: Apr. 26, 2016

(54) GENERATING AN INTERACTIVE PAGE TEMPLATE BASED ON SETTING A MATERIAL TYPE AND A PLURALITY OF INPUT AND OUTPUT SIGNALS FOR A MOBILE DEVICE

(71) Applicant: INSTITUTE FOR INFORMATION INDUSTRY, Taipei (TW)

(72) Inventors: Ren-Dar Yang, Hsinchu (TW); Hung-Sheng Chiu, New Taipei (TW); Tse-Ming Tsai, Taipei (TW); Shih-Chun Chou, Taipei (TW); Bo-Fu Liu, Tainan (TW); Jih-Yiing Lin, Zhuqi Township (TW); Yu-Ting Lin, Chiayi (TW); Pei Jiang, Zhudong Township (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 458 days.

(21) Appl. No.: 13/899,639

(22) Filed: May 22, 2013

(65) Prior Publication Data

US 2014/0164912 A1    Jun. 12, 2014

(30) Foreign Application Priority Data

Dec. 11, 2012   (TW) .............................. 101146527 A

(51) Int. Cl.
  *G06F 17/21*   (2006.01)
  *G06F 17/24*   (2006.01)
(52) U.S. Cl.
  CPC ................................... *G06F 17/248* (2013.01)
(58) Field of Classification Search
  CPC ................................................... G06F 17/248
  See application file for complete search history.

(56) References Cited

U.S. PATENT DOCUMENTS

| | | | | |
|---|---|---|---|---|
| 6,993,575 B2* | 1/2006 | Abkowitz | ......... | G06F 17/30905 707/E17.121 |
| 8,091,071 B2* | 1/2012 | Tsantilis | ................... | G06F 8/36 714/52 |
| 8,788,935 B1* | 7/2014 | Hirsch | ................ | G06F 17/2247 715/234 |
| 8,949,370 B1* | 2/2015 | Wu | ....................... | H04W 4/003 709/203 |

(Continued)

FOREIGN PATENT DOCUMENTS

| TW | 200715140 A | 4/2007 |
|---|---|---|
| TW | 200947296 A | 11/2009 |
| TW | 201209693 A | 3/2012 |

*Primary Examiner* — Asher Kells
(74) *Attorney, Agent, or Firm* — Birch, Stewart, Kolasch & Birch, LLP

(57) ABSTRACT

A method for generating at least one interactive page template is provided. The at least one interactive page template includes at least one interactive component. The interactive component is a material which can be operated by at least one input signals of the mobile device and be presented by at least one output signals of a mobile device. The method includes: receiving, via a user interface, a setting command, wherein the setting command includes at least one material type and the input signals and output signals; obtaining, by a page component exploring module, at least one interactive page component from a page component repository according to the setting command; generating, by a template generating module, at least one interactive page template, wherein the interactive page template contains the interactive page component, according to the template integrating principle stored in a template integrating principle storage module; and displaying, by the user interface, the at least one interactive page template.

16 Claims, 8 Drawing Sheets

(56) References Cited

U.S. PATENT DOCUMENTS

| | | | | |
|---|---|---|---|---|
| 2006/0031387 A1* | 2/2006 | Hamzeh | G06F 9/44526 | 709/217 |
| 2007/0083851 A1* | 4/2007 | Huang | G06F 17/248 | 717/113 |
| 2007/0162845 A1* | 7/2007 | Cave | G06F 17/218 | 715/209 |
| 2007/0162846 A1* | 7/2007 | Cave | G06F 17/3089 | 715/210 |
| 2009/0228838 A1* | 9/2009 | Ryan | G09G 5/14 | 715/853 |
| 2010/0115434 A1* | 5/2010 | Yagi | G06F 8/38 | 715/763 |
| 2010/0281475 A1* | 11/2010 | Jain | G06F 8/68 | 717/172 |
| 2011/0055687 A1* | 3/2011 | Bhandar | G06F 17/248 | 715/235 |
| 2011/0113090 A1* | 5/2011 | Peeri | G06F 9/4443 | 709/203 |
| 2011/0157215 A1* | 6/2011 | Aoyagi | G06F 3/147 | 345/593 |
| 2012/0036494 A1* | 2/2012 | Gurumohan | G06Q 10/103 | 717/106 |
| 2012/0066304 A1* | 3/2012 | Marmon | H04W 4/001 | 709/204 |
| 2012/0102386 A1* | 4/2012 | Campbell | G06F 17/3089 | 715/229 |
| 2012/0167047 A1* | 6/2012 | Wyler | H04W 4/00 | 717/122 |
| 2012/0226970 A1* | 9/2012 | Porter | G06F 9/45529 | 715/234 |
| 2013/0036196 A1* | 2/2013 | Chan | H04N 21/42202 | 709/217 |
| 2013/0159892 A1* | 6/2013 | Suraj | G06F 3/048 | 715/762 |
| 2013/0212487 A1* | 8/2013 | Cote | G06F 3/3048 | 715/745 |
| 2013/0262626 A1* | 10/2013 | Bozek | H04L 67/10 | 709/217 |
| 2014/0040712 A1* | 2/2014 | Chang | G06F 17/212 | 715/202 |
| 2014/0143656 A1* | 5/2014 | Porter | G06F 9/45529 | 715/234 |
| 2015/0019958 A1* | 1/2015 | Ying | G06F 17/248 | 715/243 |
| 2015/0020006 A1* | 1/2015 | Kotzer | G06F 17/30867 | 715/762 |

* cited by examiner

| Setting | |
|---|---|
| Material type ~510 | Interactive characteristic ~520 |
| − Image   [3] | ⦿ GPS |
| − Text    [1] | ⦿ Accelerometer |
| − Video   [1] | ○ Voice |
| − Audio   [0] | ⦿ Shock |
| − Chart   [0] | ○ Temperature-sensing |
| − Web     [0] | ○ Touch gesture |

FIG. 5

An image which can sense the touch gesture as a long touch (Image + Long touch)

An image which can sense the touch gesture as a double-click (Image + Double click)

An image which can sense the acceleration of gravity (Image + Accelerometer)

GENERATING AN INTERACTIVE PAGE TEMPLATE BASED ON SETTING A MATERIAL TYPE AND A PLURALITY OF INPUT AND OUTPUT SIGNALS FOR A MOBILE DEVICE

CROSS REFERENCE TO RELATED APPLICATIONS

This Application claims priority of Taiwan Patent Application No. 101146527, filed on Dec. 11, 2012, the entirety of which is incorporated by reference herein.

BACKGROUND OF THE INVENTION

1. Field of the Invention

The present invention relates to a generating system, method and non-transitory machine-readable storage medium of interactive page templates, and in particular, relates to a generating system, method and non-transitory machine-readable storage medium of interactive page templates, which can be used in a mobile device.

2. Description of the Related Art

Due to the rapid development of mobile devices, the App. (Application) has become a new medium of digital contents. How to produce high quality and new media contents quickly has become an important subject. The features of mobile devices comprise a variety of user input and output interfaces, such as touch screens, cameras, sensor devices and so on. With the wide variety of input and output devices, richer interactive user interface with components on an App. page could be provided. For instance, a user could interact with the components on an App. page via a touch gesture, a shake, a temperature sensor, a speech recognition module, and then the components could accordingly response with presence, expansion, zoom in, zoom out, movement, . . . etc. With the App. page comprising interactive-rich components supported by the various features of devices, the App. is developed to attract users to download and browse.

However, in addition to the design of layout and interaction, the development of the interactive components in an interactive-rich App. requires the collaboration between designers and programmers with expertise of the mobile device characteristics to transfer the design to an App. Besides the time spent on the visual design and user interface design, much more time are spent on the development of the interactive components and the communication between the designer and the programmer. As this time consuming App. generating process could not fulfill the rapidly growing demand for digital content on App. in the market, providing a convenient tool for the designer to generate interactive-rich Apps. via editing is crucial.

Using a template is a commonly used method for page design. In addition to reducing the time for designing layouts, the method can also provide style consistency among pages. Up-to-date, the design template of App. pages are limited to the layout of visual components and some special widgets regardless of the interactive components which may help the designer generating rapidly interactive-rich Apps. via applying interactive page templates in the editing process.

In order to solve the problems discussed above, there is a need to develop a generating method, system and non-transitory machine-readable storage medium of interactive page templates. The generating method, system and non-transitory machine-readable storage medium can allow designers to generate interactive page templates rapidly, and can be applied to edit the interactive pages of mobile devices.

BRIEF SUMMARY OF THE INVENTION

A detailed description is given in the following embodiments with reference to the accompanying drawings.

Systems, methods and non-transitory machine-readable storage mediums of interactive page templates are provided. The systems, methods and non-transitory machine-readable storage mediums can provide a user interface to set material types of the at least one interactive page template and input signals and output signals supported by a mobile device to obtain appropriate interactive components. Finally, the interactive page template is generated according to a template integrating principle.

In one exemplary embodiment, the disclosure is directed to a generating system of interactive page templates, used to generate an interactive page template, wherein the interactive page template is used in a mobile device and comprises at least one interactive component, and the at least one interactive component is a material which can be operated by at least one input signals of the mobile device and be presented by at least one output signals of the mobile device, the generating system comprises: a user interface, used to receive a setting command, wherein the setting command sets at least one material type used in the interactive page template and a plurality of input signals and output signals of the mobile device; and a processing unit, coupled to the user interface, comprising: a page component exploring module, used to obtain the at least one interactive component from a page component repository according to the setting command; and a template generating module, coupled to the page component exploring module and used to generate an interactive page template according to at least one template integrating principle stored in a template integrating principle storage module, wherein the interactive page template at least comprises the at least one interactive component, wherein the template generating module transmits the generated interactive page template to the user interface, and the user interface displays the generated interactive page template.

In one exemplary embodiment, the disclosure is directed to a generating method of interactive page templates, used to generate an interactive page template, and the interactive page template is used in a mobile device and comprises at least one interactive component, and the at least one interactive component is a material which can be operated by at least one input signals of the mobile device and be presented by at least one output signals of the mobile device, the generating method comprising: receiving, by a user interface, a setting command, wherein the setting command sets at least one material type used in the interactive page template and a plurality of input signals and output signals of the mobile device; obtaining, by a page component exploring module of a processing unit, at least one interactive component from a page component repository according to the setting command; generating, by a template generating module of the processing unit, an interactive page template according to the at least one template integrating principle stored in a template integrating principle storage module, wherein the interactive page template at least comprises the at least one interactive component; and displaying, by the user interface, the interactive page template.

In one exemplary embodiment, the disclosure is directed to a non-transitory computer-readable storage medium comprising computer programs, which, when executed, causes a device to perform a generating method of interactive page templates, wherein the method is used generate an interactive page template, and the interactive page template is used in a mobile device and comprises at least one interactive component, and the at least one interactive component is a material which can be operated by at least one input signals of the mobile device and be presented by at least one output signals of the mobile device, the non-transitory computer-readable medium comprising: a first computer program code for receiving a setting command by a user interface, wherein the setting command comprises at least one material type used in the interactive page template and a plurality of input signals and output signals of the mobile device; and a second computer program code for obtaining at least one interactive component from a page component repository according to the setting command by a page component exploring module of a processing unit; a third computer program code for generating an interactive page template according to the at least one template integrating principle stored in a template integrating principle storage module by a template generating module of the processing unit, wherein the interactive page template at least comprises the at least one interactive component; and a fourth computer program code for displaying the interactive page template by the user interface.

BRIEF DESCRIPTION OF THE DRAWINGS

The present invention can be more fully understood by reading the subsequent detailed description and examples with references made to the accompanying drawings, wherein:

FIG. 5 is a schematic diagram of the user interface illustrating a user setting at least one material type of the interactive page template according to an embodiment of the present invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
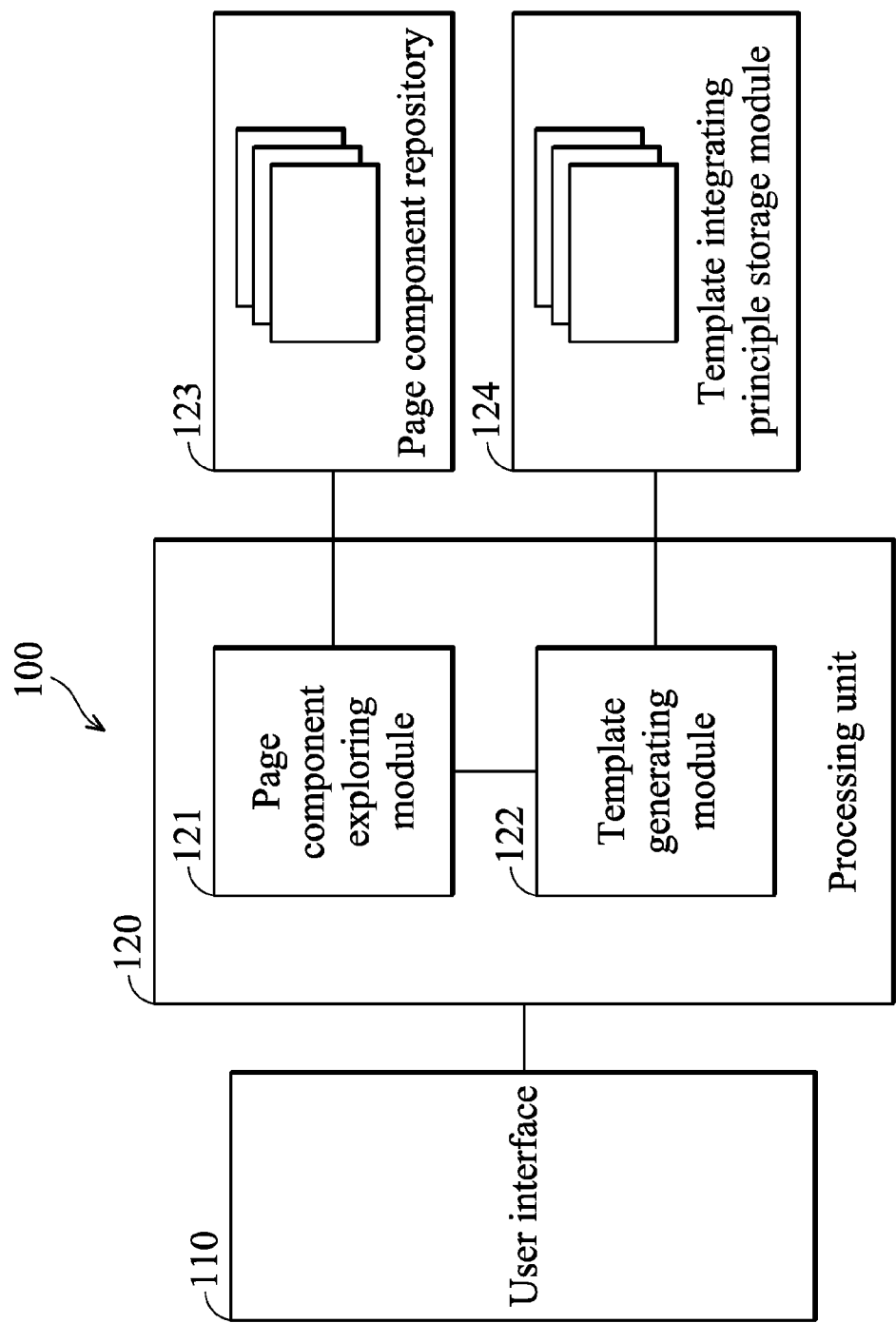
FIG. 1 is a schematic diagram of a generating system of interactive page templates according to a first embodiment of the present invention.

FIG. 1 is a schematic diagram of a generating system 100 of interactive page templates according to a first embodiment of the present invention. The generating system 100 is used to generate an interactive page template, and comprises a user interface 110 and a processing unit 120. The processing unit 120 is coupled to the user interface 110. The processing unit 120 comprises a page component exploring module 121 and a template generating module 122. In addition, the processing unit 120 can be coupled to a page component repository 123 and a template integrating principle storage module 124. The page component exploring module 121 is coupled to the template generating module 122 and the page component repository 123. The template generating module 122 is coupled to the page component exploring module 121 and the template integrating principle storage module 124. In the embodiment, the interactive page template can be used in a mobile device and comprises at least one interactive component. The at least one interactive component is a material which can be operated by at least one input signals of the mobile device and be presented by at least one output signals of the mobile device.

The page component repository 123 is used to store a plurality of interactive components, and the template integrating principle storage module 124 is used to store at least one template integrating principle.

The user interface 110 is used to receive a setting command input from the user and transmit it to the processing unit 120, wherein the setting command sets at least one material type used in the interactive page template and a plurality of input signals and output signals of the mobile device. For example, there can be many interactive components in the interactive page template, and the at least one interactive component is a material which can be presented according to the input signal of the mobile device by the output signal of the mobile device, such as an image or sound vibration, etc. The material may comprise a variety of different types and the mobile device can transmit a variety of different input signals and output signals. The details about setting at least one material type will be described in the embodiments below.

The page component exploring module 121 obtains at least one interactive component from a page component repository 123 according to the setting command transmitted from the user interface 110, and transmits the at least one interactive component to the template generating module 122, wherein the obtained interactive component conforms to the material type, is operated by at least one input signals of the mobile device, and is presented by at least one input signal of the mobile device. Furthermore, the page component exploring module 121 can obtain a plurality of candidate interactive components from the page component repository 123, and then selects at least one candidate interactive component from the plurality of candidate interactive components as the at least one interactive component according to an accumulated data of each candidate interactive component (for example, an accumulated number indicating the amount of times each candidate component has been adopted in the interactive page template or an accumulated number indicating the amount of times each candidate component has been used in other interactive page templates). After the page component exploring module 121 obtains the plurality of candidate interactive components from the page component repository 123, the page component exploring module 121 may also select at least one candidate interactive component from the plurality of candidate interactive components as the at least one obtained interactive component according to a pre-determined sequence, other rules, or randomly.

In another embodiment, when the page component exploring module 121 can not obtain the at least one interactive component from the page component repository 123 according to the setting command, the page component exploring module 121 generates at least one new interactive component according to the at least one material type and one of the plurality of input signals and output signals of the mobile device and stores the new interactive component into the page component repository 123 where the accumulated data could be recorded.

After the template generating module 122 receives the at least one interactive component transmitted by the page component exploring module 121, the template generating module 122 generates an interactive page template according to the at least one template integrating principle stored in a template integrating principle storage module 124, wherein the interactive page template comprises at least one interactive component. Then, the template generating module 122 transmits the interactive page template to the user interface 110, and the user interface displays the interactive page template. Furthermore, the template generating module 122 can obtain at least one template integrating principle from the template integrating principle storage module 124 according to the at least one obtained interactive component and the setting command. The template integrating principle storage module 124 can establish more than one template integrating principle in advance. For example, a template integrating principle can correspond to a group of components presenting a style. The probability model of the position and size of each component in the group can be adopted as a layout principle of a page component combination presenting the style of the group of components. In another embodiment, the template integrating principle can be a layout principle typesetting a group of page components according to the user's setting and a specific layout constraint. In some embodiments, the interactive page template can comprise at least one interactive component transmitted by the page component exploring module 121 and other components (such as non-interactive components, graphics, texts, etc). In another embodiment, the interactive page template can also comprise the at least one interactive component transmitted by the page component exploring module 121 and other interactive components.

In one specific embodiment, the user interface 110 can receive a user preference setting command, which is input by the user. The page component repository adjusts, according to the user preference setting command, the probability of selecting the at least one interactive component from the page component repository to generate the interactive page template. The template integrating principle storage module 124 can add, modify or adjust the template integrating principles according to the user preference setting command so that the templates that conform to the user's preference have higher scores. Then, the template generating module 122 re-generates an updated interactive page template according to the added, modified or adjusted template integrating principle. It is worth noting that the template integrating principle must conform to a design principle of page component attributes, a design principle of the interaction and a design principle of the user preference. For example, the design principle of page component attributes must conform to the page size, the number of the page components, the layout principles, and so on.

Figure 2:
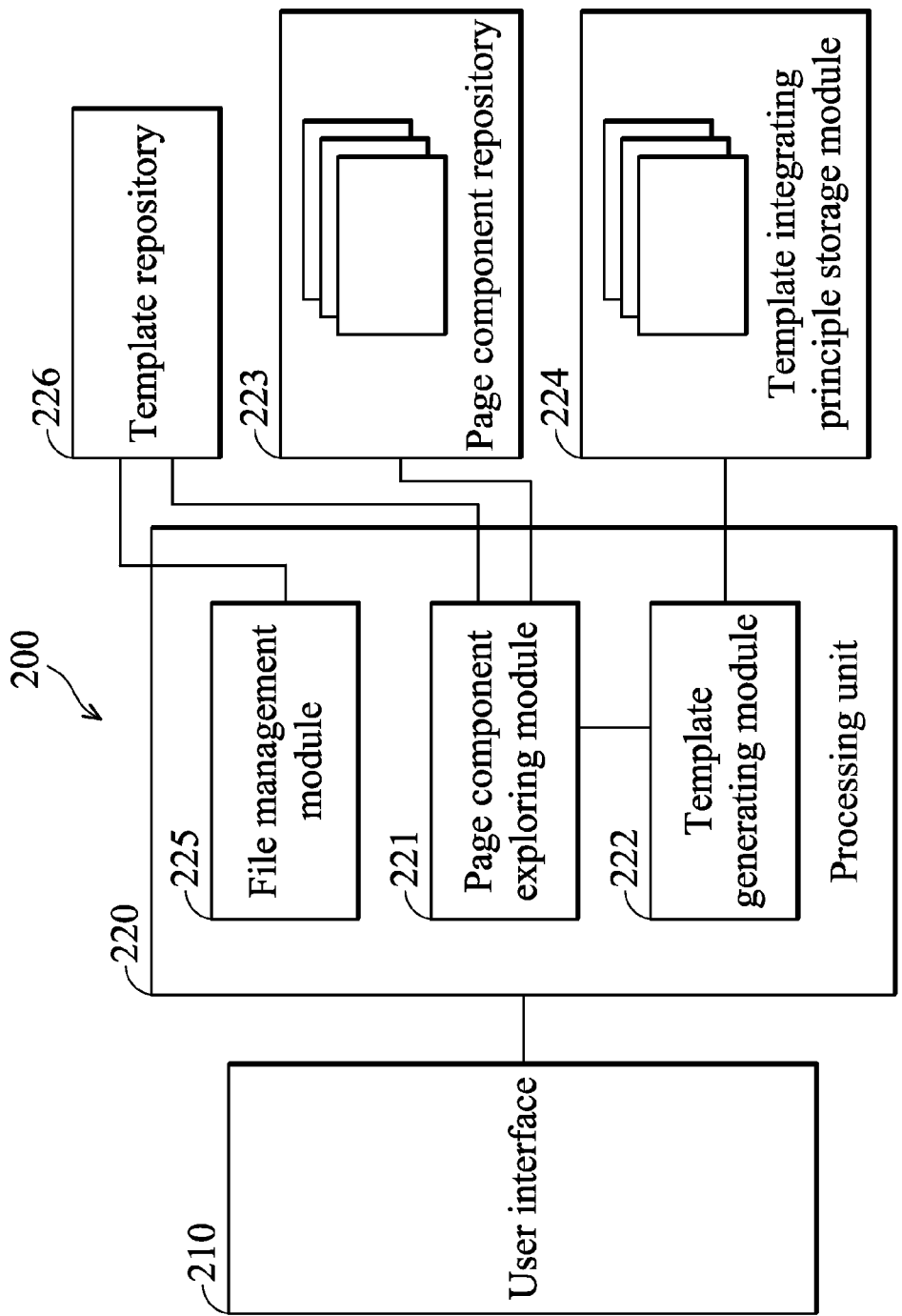
FIG. 2 is a schematic diagram of a generating system of interactive page templates according to a second embodiment of the present invention.

FIG. 2 is a schematic diagram of a generating system 200 of interactive page templates according to a second embodiment of the present invention. The generating system 200 comprises a user interface 210 and a processing unit 220. The processing unit 220 is coupled to the user interface 210. The processing unit 220 comprises a page component exploring module 221, a template generating module 222 and a file management module 225, and is coupled to a page component repository 223, a template integrating principle storage module 224 and a template repository 226. The page component exploring module 221 is coupled to the template generating module 222, the page component repository 223 and the template repository 226. The template generating module 222 is coupled to the page component exploring module 221 and the template integrating principle storage module 224. The components having the same name as described in the first embodiment have the same function, so details related to the functions of the components will be omitted. The main difference between FIG. 1 and FIG. 2 is that the processing unit 220 further comprises the file management module 225 and the template repository 226 coupled to the file management module 225.

In the second embodiment, the file management module 225 may import a plurality of template files into the template repository 226 to increase the stored templates, or export the at least one interactive page template generated by the template generating module 222 and transfer to the template files to provide a way for the user to apply the interactive page template. The template repository 226 is used to store a plurality of stored templates, and each stored template comprises more than one interactive component. When the page component exploring module 221 obtains a plurality of the candidate interactive components from the page component repository 223, the page component exploring module 221 can find stored templates which comprise the candidate interactive components from the stored templates stored in the template repository 226 as at least one candidate template. In addition, the template generating module 222 can refer to the at least one candidate template to generate a new interactive template, for example, the template generating module 222 can add/reduce the number of other components, or modify/adjust the positions or the display settings of the at least one interactive component in the candidate template or other components. In another specific embodiment, the step of finding the stored templates which comprise the candidate interactive components from the stored templates stored in the template repository 226 as at least one candidate template can also be performed by the template generating module 222. For example, the page component exploring module 221 is coupled to the template generating module 222 and the page component repository 223, and the template generating module 222 is coupled to the page component exploring module 221, the template integrating principle storage module 224 and the template repository 226. Then, the page component exploring module 221 obtains a plurality of candidate interactive components from the page component repository 223. The template generating module 222 finds the stored templates which comprise the candidate interactive components from the stored templates stored in the template repository 226 as the at least one candidate template to generate a new interactive template.

Figure 3:
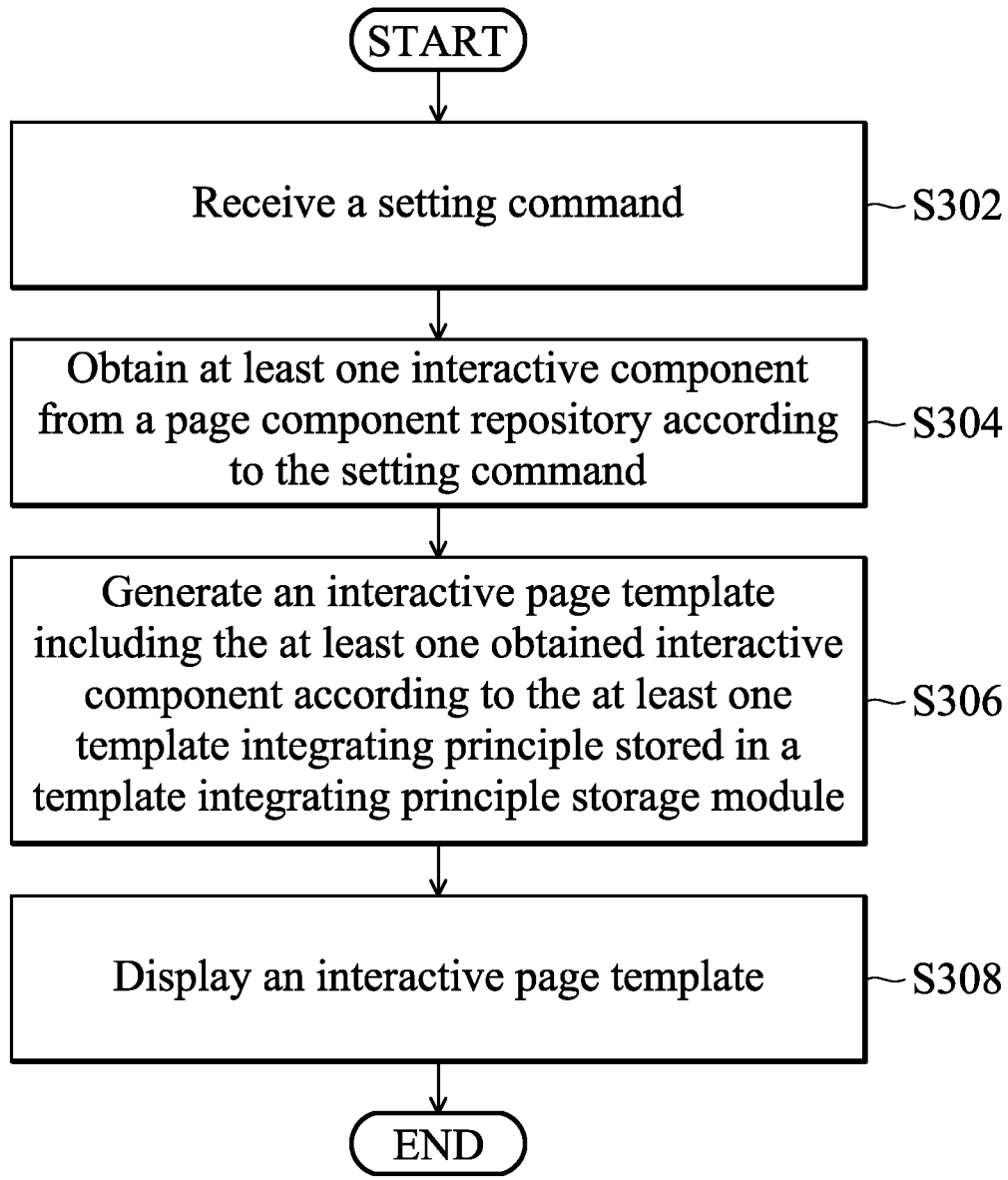
FIG. 3 is a flow diagram illustrating that the generating method of interactive page templates according to the first embodiment of the present invention.

FIG. 3 is a flow diagram illustrating that the generating method of interactive page templates according to the first embodiment of the present invention with reference to FIG. 1. First, in step S302, a user interface receives a setting command. In step S304, a page component exploring module obtains at least one interactive component from a page component repository according to the setting command. Then, in step S306, a template generating module generates an interactive page template including the at least one obtained interactive component according to the at least one template integrating principle stored in a template integrating principle storage module. Finally, in step S308, the user interface displays an interactive page template.

Figure 4:
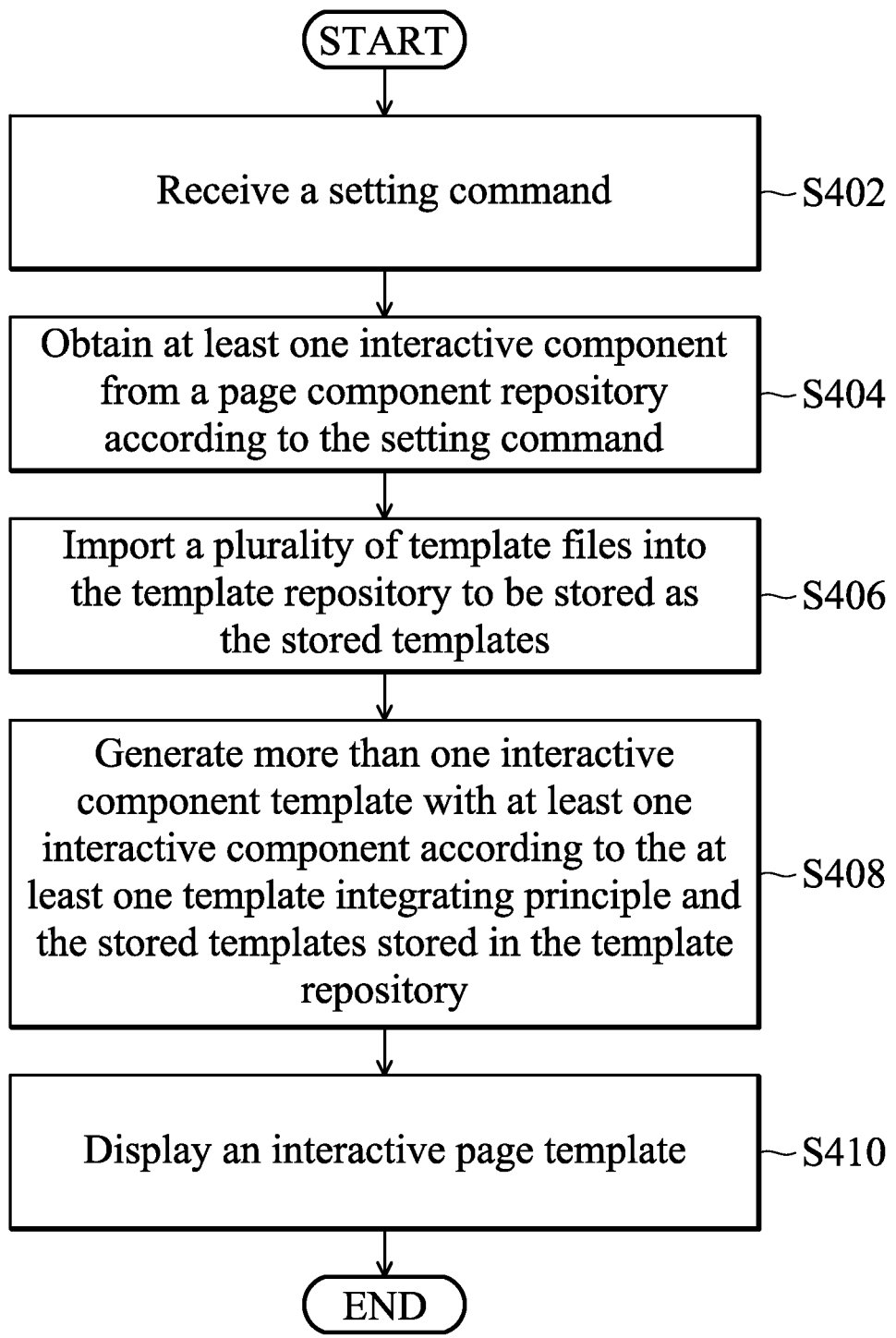
FIG. 4 is a flow diagram illustrating that the generating method of interactive page templates according to the second embodiment of the present invention.

FIG. 4 is a flow diagram illustrating that the generating method of interactive page templates according to the second embodiment of the present invention with reference to FIG. 2. First, in step S402, a user interface receives a setting command. In step S404, a page component exploring module obtains at least one interactive component from a page component repository according to the setting command. In step S406, the file management module 225 imports a plurality of template files into the template repository to be stored as the stored templates. Then, in step S408, the template generating module 222 generates more than one interactive component template with at least one interactive component according to the at least one template integrating principle and the stored templates stored in the template repository. Finally, in step S410, the user interface displays an interactive page template.

FIG. 5 is a schematic diagram of the user interface illustrating a user setting at least one material type of the interactive page template according to an embodiment of the present invention. As show in FIG. 5, the at least one material type 510 is the input signal of the mobile device. The at least one material type 510 may be one of images, texts, videos, audios, charts, and web pages and so on. The interactive characteristic 520 may be one of the options for the input and output signal of the mobile device. The interactive characteristic 520 may correspond a global positioning system (GPS) interactive function, an accelerometer interactive function, a voice interactive function, a shock interactive function, a temperature-sensing interactive function, a touch gesture interactive function or other functions. The user can enter a setting command to select the at least one material type and the amount of the at least one material type preferred by the user, and chooses an interactive characteristic which could be combined with the at least one material type 510. The page component exploring module can generate a new at least one interactive component according to the at least one material type and one of the plurality of input signals and output signals of the mobile device, and store the at least one interactive component in the page component repository. Then, the template generating module generates more than one interactive page template with the page components according to the at least one template integrating principle.

Figure 6A:
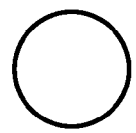
FIG. 6A is a schematic diagram illustrating the page component exploring module generating interactive components which may be used in the interactive page template according to the at least one material type, the input signals and the output signals according to an embodiment of the present invention.
Figure 6A:
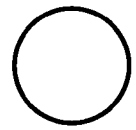
Figure 6A:
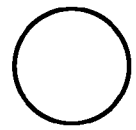
Figure 6B:
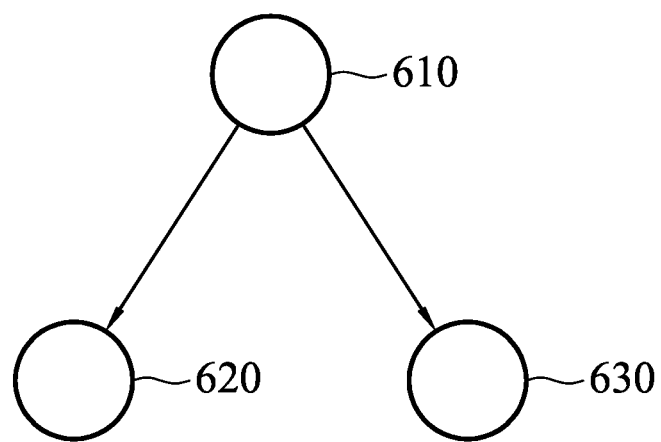
FIG. 6B is a schematic diagram illustrating the template generating module generating an interactive relationship between the interactive components according to the attributes of the interactive components in the embodiment of the present invention.

After the user sets the at least one material type, the input signals and the output signals in the interactive page template, the page component exploring module can generate interactive components which may be used in the interactive page template according to the at least one material type, the input signals and the output signals. FIGS. 6A~6B are schematic diagrams illustrating the page component exploring module generating an interactive component which may be used in the interactive page template according to the at least one material type, the input signals and the output signals according to an embodiment of the present invention. In the embodiment, an image is employed as the at least one material type. The image can be combined with different input signals and output signals to generate different interactive components. As shown in FIG. 6A, the page component exploring module generates three groups of the at least one interactive component. The first group of the at least one interactive component is an image which can sense the touch gesture as a long touch (Image+Long touch). The second group of the at least one interactive component is an image which can sense the touch gesture as a double-click (Image+Double click). The third group of the at least one interactive component is an image which can sense the acceleration of gravity (Image+Accelerometer). Therefore, after the user setting, the page component exploring module stores the at least one interactive component which conform to the at least one material type, the input signals and the output signals set by the user in the page component repository. The at least one interactive component stored in the page component repository can be selected by the template generating module according to the template integrating principle to generate a new interactive page template. The template generating module can generate an interactive relationship between the at least one interactive component according to the attributes of the selected interactive components. The interactive relationship between the images in FIG. 6B is employed as an example, wherein after the image 610 senses a touch, the image 620 and the image 630 will move along a direction according to the vector of the accelerometer.

Figure 7:
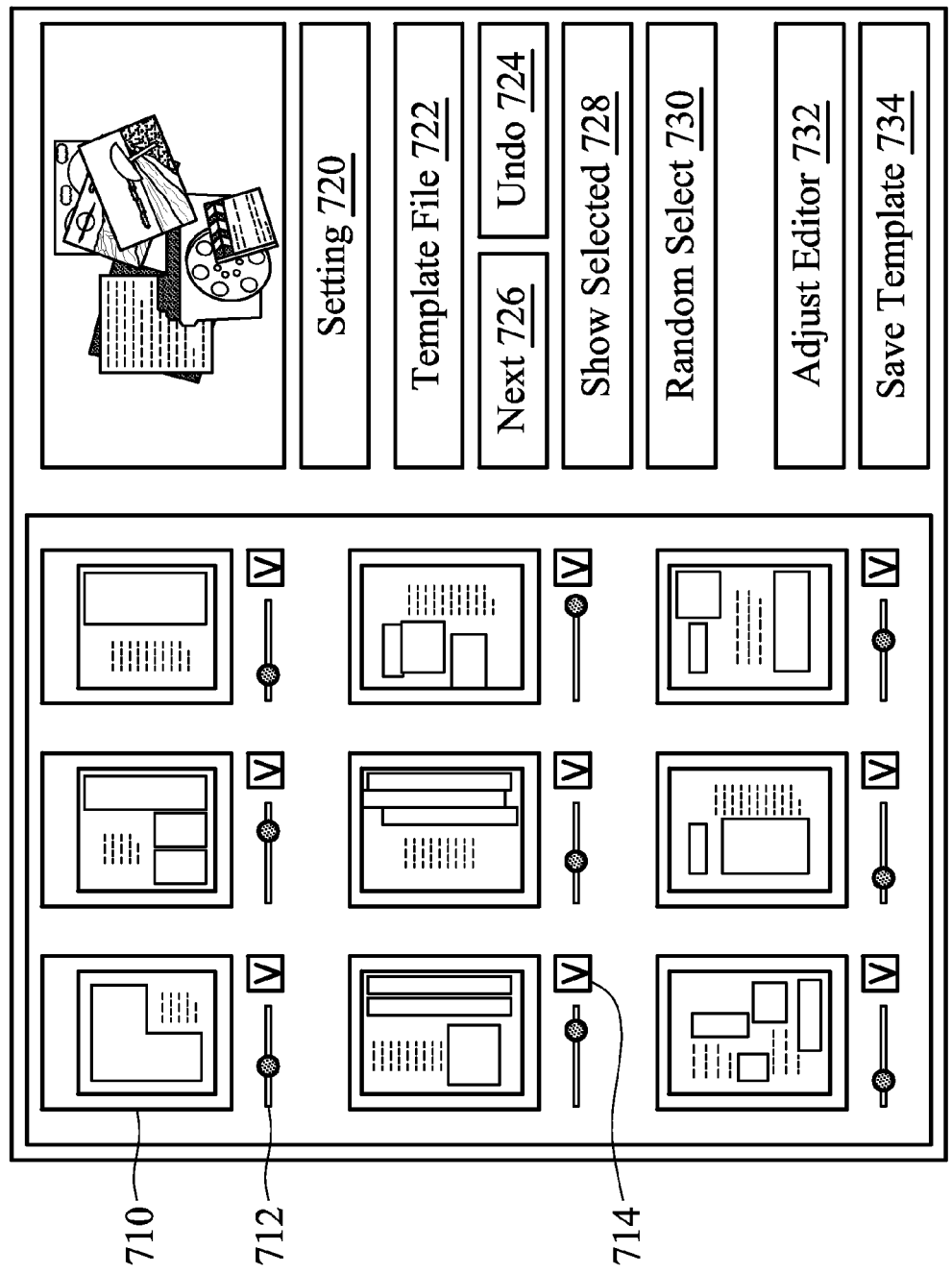
FIG. 7 is a schematic diagram illustrating the user interface displaying a plurality of interactive page templates according to an embodiment of the present invention.

FIG. 7 is a schematic diagram illustrating the user interface displaying a plurality of interactive page templates according to an embodiment of the present invention. As show in FIG. 7, the plurality of interactive page templates 710 are shown on the left in FIG. 7. There is a scroll bar 712 below each of the interactive page templates 710, and the user can use the scroll bar 712 to score the interactive page templates 710 so that the interactive page templates which conforms to the combination preferred by the user has a higher score. When the template generating module generates the template, the template generating module may select the interactive page templates with higher probability as a reference for generating templates. In addition, each page template 710 further can provide a select button 714 for the user to select templates the user likes. The right side of the user interface can comprise a "Setting" button 720, a "Template File" button 722, a "Undo" button 724, a "Next" button 726, a "Show Selected" button 728, a "Random Select" button 730, an "Adjust Editor" button 732 and a "Save Template" button 734. The "Setting" button 720 is used for the user to set the possible material type, input signals and output signals used in the template. The "Template File" button 722 is used for the user to select the template files the user requires and apply the selected template files into the selected page templates. The "Adjust Editor" button 732 is used to display the selected page templates in a new window and let the user fine-tune the selected page templates, and provides the user to specify the input signal and the output signal directly. About the remaining buttons which are not illustrated in the invention, one of ordinary skill in the art can understand the functions of the other buttons which are not illustrated, so the details related to the functions of the other buttons will be omitted.

The generating method of interactive page templates or any forms for carrying out the method, or any parts thereof may be implemented in a computer program, wherein the computer program may be stored in any machine-readable storage medium, such as a floppy disc, hard disc, optical disc, or computer program product with any external form. Particularly, when the computer program is loaded and executed by an electronic device, e.g., a computer, the electronic device becomes an apparatus or system for performing the steps of the generating method of interactive page templates. Alternatively, the computer program may be transferred via certain transferring media, such as electric wires/cables, optical fibers, or others.

Correspondingly, the invention also proposes a machine-readable storage medium comprising a computer program, which, when executed, causes an electronic device to perform the generating method of interactive page template. The steps of the method are as described above with respect to FIGS. 3~4 and, thus, detailed description of the method is omitted here for brevity.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A generating method of interactive page templates, used to generate an interactive page template, and the interactive page template is used in a mobile device and comprises at least one interactive component, and the at least one interactive component is a material which can be operated by at least one input signals of the mobile device and be presented by at least one output signals of the mobile device, the generating method comprising:
    receiving, by a user interface, a setting command, wherein the setting command sets at least one material type used in the interactive page template and a plurality of input signals and output signals of the mobile device;
    obtaining, by a page component exploring module of a processing unit, at least one interactive component from a page component repository according to the setting command;
    generating, by a template generating module of the processing unit, an interactive page template according to the at least one template integrating principle stored in a template integrating principle storage module, wherein the interactive page template at least comprises the at least one interactive component; and
    displaying, by the user interface, the interactive page template.

2. The generating method of interactive page templates as claimed in claim 1, further comprising:
    obtaining, by the page component exploring module, at least one candidate template from a template repository according to the setting command, wherein the candidate template comprises the at least one interactive component, and
    generating, by the template generating module, the interactive page template according to the at least one candidate template and the at least one template integrating principle.

3. The generating method of interactive page templates as claimed in claim 2, further comprising:
    generating, by the page component exploring module, at least one new interactive component according to the at least one material type and the plurality of input signals and output signals of the mobile device and storing, the at least one new interactive component into the page component repository when the page component exploring module can not obtain at least one interactive component from the page component repository according to the setting command.

4. The generating method of interactive page templates as claimed in claim 2, further comprising:
    obtaining, by the page component exploring module, a plurality of candidate interactive components from the page component repository, and then selecting at least one stored template from the plurality of candidate interactive components as the candidate template according to the obtained candidate interactive components comprised in each template in the template repository.

5. The generating method of interactive page templates as claimed in claim 1, further comprising:
    receiving, by the user interface, a user preference setting command; and
    adjusting, by the page component exploring module, the probability of the at least one interactive component being selected from the page component repository to generate the interactive page template according to the user preference setting command.

6. The generating method of interactive page templates as claimed in claim 5, further comprising:
    adding, modifying or adjusting, by the template integrating principle storage module, the at least one template integrating principle according to the user preference setting command; and
    re-generating, by the template generating module, an updated interactive page template according to the at least one added, modified or adjusted template integrating principle.

7. The generating method of interactive page templates as claimed in claim 1, further comprising:
    importing or exporting, by a file management module, a plurality of template files.

8. The generating method of interactive page templates as claimed in claim 1, further comprising:
    obtaining, by the page component exploring module, a plurality of candidate interactive components from the page component repository, and then selecting at least one candidate interactive component from the plurality of candidate interactive components as the at least one interactive component according to an accumulated data of each candidate interactive component.

9. A non-transitory computer-readable storage medium comprising computer programs, which, when executed, causes a device to perform a generating method of interactive page templates, wherein the method is used generate an interactive page template, and the interactive page template is used in a mobile device and comprises at least one interactive component, and the at least one interactive component is a material which can be operated by at least one input signals of the mobile device and be presented by at least one output signals of the mobile device, the non-transitory computer-readable medium comprising:
    receiving a setting command by a user interface, wherein the setting command comprises at least one material type used in the interactive page template and a plurality of input signals and output signals of the mobile device; and
    obtaining at least one interactive component from a page component repository according to the setting command by a page component exploring module of a processing unit;
    generating an interactive page template according to the at least one template integrating principle stored in a template integrating principle storage module by a template generating module of the processing unit, wherein the interactive page template at least comprises the at least one interactive component; and
    displaying the interactive page template by the user interface.

10. The non-transitory computer-readable storage medium as claimed in claim 9, wherein the non-transitory computer-readable medium further comprising:
    obtaining at least one candidate template from a template repository according to the setting command, and the candidate template comprises the at least one interactive component; and generating the interactive page template according to the at least one candidate template and the at least one template integrating principle.

11. The non-transitory computer-readable storage medium as claimed in claim 10, wherein the non-transitory computer-readable medium further comprising:

when at least one interactive component from the page component repository is not obtained according to the setting command, generating at least one new interactive component according to the at least one material type and the plurality of input signals and outputting signals of the mobile device and storing the at least one new interactive component into the page component repository.

12. The non-transitory computer-readable storage medium as claimed in claim 10, wherein the non-transitory computer-readable medium further comprising:

obtaining a plurality of candidate interactive components, and then selecting at least one stored template from the template repository as the candidate template according to the obtained candidate interactive components in each template in the template repository.

13. The non-transitory computer-readable storage medium as claimed in claim 9, wherein the non-transitory computer-readable medium further comprising:

receiving a user preference setting command; and adjusting, according to the user preference setting command, the probability of the at least one interactive component being selected from the page component repository to generate the interactive page template.

14. The non-transitory computer-readable storage medium as claimed in claim 13, wherein the non-transitory computer-readable medium further comprising:

adding, modifying or adjusting the at least one template integrating principle according to the user preference setting command; and re-generating an updated interactive page template according to the at least one added, modified or adjusted template integrating principle.

15. The non-transitory computer-readable storage medium as claimed in claim 9, the non-transitory computer-readable medium further comprising:

importing or exporting a plurality of template files.

16. The non-transitory computer-readable storage medium as claimed in claim 9, wherein the non-transitory computer-readable medium further comprising:

obtaining a plurality of candidate interactive components from the page component repository, and then selecting at least one candidate interactive component from the plurality of candidate interactive components as the at least one interactive component according to an accumulated data of each candidate interactive component.

* * * * *